United States Patent
Barak et al.

(10) Patent No.: US 6,788,772 B2
(45) Date of Patent: Sep. 7, 2004

(54) SYSTEM AND METHOD FOR CONTROLLING OUTGOING TELEPHONE CALLS

(76) Inventors: Zvi Barak, Hashcafim 46, Ra-anana, Ra-anana (IL), 43724; Sarah Barak, Hashcafim 46, Ra-anana, Ra-anana (IL), 43724; Gad Barak, Hashcafim 46, Ra-anana, Ra-anana (IL), 43724

( * ) Notice: Subject to any disclaimer, the term of this patent is extended or adjusted under 35 U.S.C. 154(b) by 6 days.

(21) Appl. No.: 09/988,175

(22) Filed: Nov. 19, 2001

(65) Prior Publication Data

US 2002/0126820 A1 Sep. 12, 2002

Related U.S. Application Data

(60) Provisional application No. 60/273,529, filed on Mar. 7, 2001.

(51) Int. Cl.$^7$ ............................................. H04M 15/00
(52) U.S. Cl. ............. 379/130; 379/114.05; 379/114.01; 379/133
(58) Field of Search ..................... 379/114.01, 201.12, 379/120, 121.01, 210.02

(56) References Cited

U.S. PATENT DOCUMENTS

| | | | | |
|---|---|---|---|---|
| 3,638,193 A | * | 1/1972 | Opferman et al. .......... 307/113 |
| 5,206,899 A | * | 4/1993 | Gupta et al. ................ 379/120 |
| 5,483,588 A | * | 1/1996 | Eaton et al. ........... 379/202.01 |
| 5,557,665 A | * | 9/1996 | Yamamoto ................... 379/198 |
| 5,638,428 A | * | 6/1997 | Berku et al. ........... 379/100.06 |
| 5,839,067 A | * | 11/1998 | Jonsson ...................... 455/422 |
| 5,867,562 A | * | 2/1999 | Scherer ................... 379/88.21 |
| 6,038,307 A | * | 3/2000 | Fahrer et al. .......... 379/209.01 |
| 6,134,310 A | * | 10/2000 | Swan et al. ................. 379/188 |
| 6,154,535 A | * | 11/2000 | Velamuri et al. ...... 379/211.01 |
| 6,226,364 B1 | * | 5/2001 | O'Neil .................... 379/114.2 |
| 6,246,756 B1 | * | 6/2001 | Borland et al. ........ 379/142.01 |
| 2002/0136374 A1 | * | 9/2002 | Fleischer et al. ...... 379/114.01 |

* cited by examiner

Primary Examiner—Ahmad F. Matar
Assistant Examiner—Hector Agdeppa
(74) Attorney, Agent, or Firm—Gordon & Jacobson, P.C.

(57) ABSTRACT

A telephone call control system includes a database containing user identifiers and call control limitations assigned to the user identifiers. Call control limitations may include budgetary, time, geographic (e.g., area code or city and/or country codes), and other limitations to a call. A telephone line is subscribed to the system, and users of the line are provided user identifiers which may have one or more of the call control limitations. When making an outgoing call, the telephone network queries the database and determine whether the telephone line is subscribed. If the telephone is subscribed, the telephone network communicates with a server which requests the user to enter the user's identifier, e.g., a dialing code or voice print. It is then determined which, if any, call control limitations, are placed upon the user and whether and for how long the call can be connected.

5 Claims, 7 Drawing Sheets

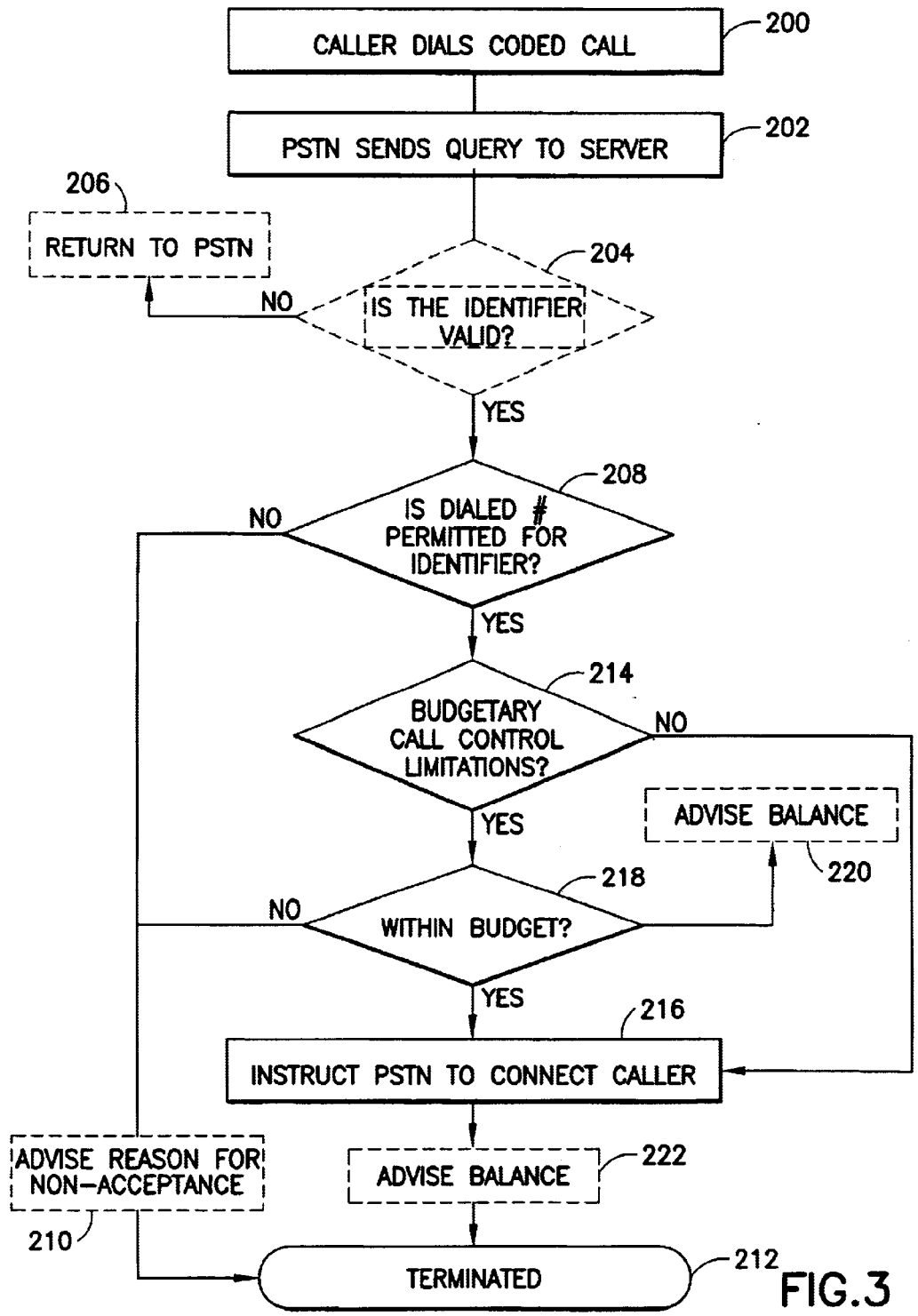

SYSTEM AND METHOD FOR CONTROLLING OUTGOING TELEPHONE CALLS

This application claims priority from U.S. provisional application Serial No. 60/273,529, filed Mar. 7, 2001, and entitled "A System and Method for Controlling Telephone Calls", which is hereby incorporated by reference herein in its entirety.

BACKGROUND OF THE INVENTION

1. Field of the Invention

This invention relates broadly to telecommunications systems. More particularly, this invention relates to controlling and budgeting the cost of outgoing telephone calls over a public telephone network.

2. State of the Art

The telephone bill can be a significant expenditure each billing period. Calls, particularly in a household which includes teenagers and young adults, are often lengthy, long distance, and expensive. However, it is difficult to enforce restrictions on an individual's use of the telephone, as it may not be known to the heads of the household that a child is on the telephone, for how long, with whom, and/or the immediate expense of such telephone calls.

In addition, in dorm rooms or shared apartments and houses it is difficult to track which individuals made which calls and determine who is responsible for any portion of the telephone bill.

Moreover, in a business setting it is desirable to log who has made particular telephone calls, for purposes of client billing or employee accountability. Furthermore, it may be desirable to safeguard the telephone system from unauthorized use.

SUMMARY OF THE INVENTION

It is therefore an object of the invention to provide a system for controlling and logging outgoing telephone calls.

It is also an object of the invention to provide a system for controlling and logging telephone calls which can be used with both landline and wireless telephones.

It is another object of the invention to provide a system which can be modified by an authorized subscriber (primary user) of the system whenever desired.

In accord with these objects, which will be discussed in detail below, a system for controlling and logging telephone calls is provided. The system includes a server having a database containing lists of user identifiers and optionally call control limitations assigned to the user identifiers. Call control limitations may include budgetary, length of call, time/day of call, geographic (e.g., area code or city and/or country codes) and/or other limitations to call connection. A telephone line of a telephone network (e.g., the PSTN) is subscribed to the system, and each user of a telephone coupled to a subscribed line is assigned (or created) a user identifier (e.g., a numeric dialing code identifier, a code word, or voice print) which may have one or more of the call control limitations associated therewith. A primary user of the subscribed line can interact with the server, e.g., over the Internet, to set user identifiers and associated call control limitations.

In order to make an outgoing call, a user places the telephone off-hook and dials a destination telephone number which causes the telephone network to query the database and determine whether the telephone line is subscribed. If the telephone line is subscribed, the PSTN communicates with the server which, in turn, requests the user to enter the user's identifier, e.g., DTMF, voice print, or codes. It is then determined from the database which, if any, call control limitations, are placed upon the user and whether and for how long the call may be connected. A log of connected calls is maintained and accessible from the Internet.

Additional objects and advantages of the invention will become apparent to those skilled in the art upon reference to the detailed description taken in conjunction with the provided figures.

BRIEF DESCRIPTION OF THE DRAWINGS

FIG. 3 is flow diagrams of another call recording embodiment according to the invention;

DETAILED DESCRIPTION OF THE PREFERRED EMBODIMENTS

Figure 1:
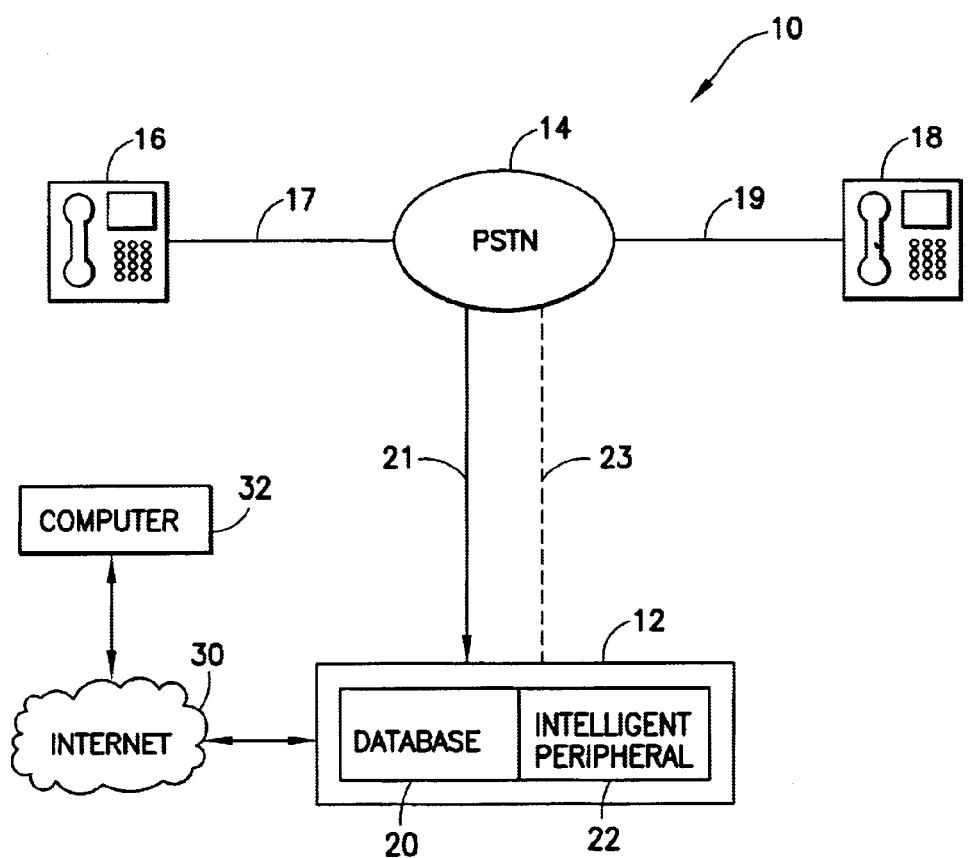
FIG. 1 is a schematic diagram of a system for outgoing telephone call control according to a first embodiment of the invention.

Turning now to FIG. 1, a first embodiment of a system 10 for controlling and logging telephone calls according to the invention is shown. The system 10 includes a server 12 in communication with a telephone network 14 such as the public switched telephone network (PSTN) and the public land mobile network, and also in communication with the Internet 30. Telephones 16, 18 are coupled to telephone lines 17, 19 also in communication with the telephone network 14. The server 12 is in communication with the telephone network 14, preferably over a dataline 21 and via an Intelligent Network using, e.g., SS7 or another data signalling system. Additionally, the server 12 may be in communication with the telephone network 14 over a voice line 23.

The server 12 includes a database 20 and optionally an intelligent peripheral 22 with interactive voice response (IVR) functionality. Alternatively, the intelligent peripheral 22 may be part of the PSTN and communicate with the server 12 over the dataline 21. In addition, the server may be implemented as software or hardware at a service control point (SCP) within the Intelligent Network, or may be separate from the SCP. The database 20 contains lists of subscribed telephone numbers, user identifiers associated with the telephone numbers, optionally call control limitations assigned to the user identifiers, and updatable account information associated with the user identifiers.

Call control limitations may include budgetary, time of day/day of week (e.g., certain calls may be restricted to weekends or limited evening hours), length of call (regardless of budgetary limitations), telephone system (e.g., calls from a PSTN telephone may be limited to other PSTN telephones and restricted from calling telephones which are part of a mobile network), class of service, geographic limitations (e.g., area code or city and/or country codes), and particular telephone number exclusions which are placed on a call made by a user of a telephone on a subscribed telephone line, as discussed below.

A primary (authorized person) on the telephone line may subscribe the telephone line to the system by contacting a service provider for the system (e.g., a company which owns the server), preferably via an Internet web site, e.g., from a home computer at the same residence as the telephone line or from an office computer at the same business site as the telephone line (or another site of the same business), and requesting the addition of the call control service to the telephone line. This results in an account being established for the telephone line, and the telephone line being added to the database 20 on the server 12. Alternatively, an account may be established, for example, by interacting with a customer service employee of the service provider, via an IVR system, or by transmitting an application via facsimile to the service provider.

Once the account is established, the primary preferably interacts with the server from his or her computer 32 over the Internet 30 to set up the account parameters. That is, the primary assigns user identifiers to individuals who use the subscribed line (or allows each individual to select his or her own user identifier), and may also assign particular call control limitations to one or more of the user identifiers. Moreover, the primary may change the call control limitations at any time, e.g., by logging into the account via the Internet at a computer, via an IVR system, or by calling/faxing a customer service location. Thus, if a user depletes a budgetary limitation during a billing period, the user may request the primary to add credit to the user's account, and the primary may do so at any time. Likewise, any other limitation may be added, removed, or modified at any time by the primary.

The primary may be a parent in a family situation, a business manager, or an agreed upon individual in other situations, such as with roommates. However, the primary need not be a user of the subscribed telephone. For example, a parent may agree to pay a child's telephone bill even if the child lives outside the parent's house, provided that the parent can set restrictions (i.e., call control limitations) on the use of the telephone. In addition, a school administrator may set the restrictions for dormitory room telephones subscribed to the system. Moreover, the primary's control is not limited to the telephones on the subscribed line, but may be extended to any telephone call that is billed to an account of the subscribed line. For example, calling card calls made at a pay telephone but billed to a telephone account controlled by the primary may be controlled.

Furthermore, the primary may establish a set of one or more 'restricted' telephone numbers which cannot be dialed from a telephone on the telephone line unless a user identifier is entered at the telephone, and that user identifier is permitted to make the call. Examples of restricted telephone numbers includes all telephone numbers, all telephone numbers other than emergency telephone numbers (e.g., police, fire, ambulance, '911'), all telephone numbers other than local telephone calls, all telephone numbers within a particular area code (or country and city code), and particular individual telephone numbers. One preferred manner of defining restricted telephone numbers is to use a mask, by which all numbers beginning with any one or more digits or a range of numbers can be labeled as 'restricted'. For example, the mask 1-212-xxx-xxxx would restrict all calls to the '212' area code from a subscribed line in the United States. Alternatively, the 'restricted' telephone numbers may be defined by providing a mask of the only telephone numbers which are permitted to be called; i.e., the restricted telephone numbers are those other than the numbers explicitly permitted.

A user identifier may be a numeric dialing code, system recognizable voice print, a code word, or other identifier which is only associated with one user of a subscribed line.

Figure 2A:
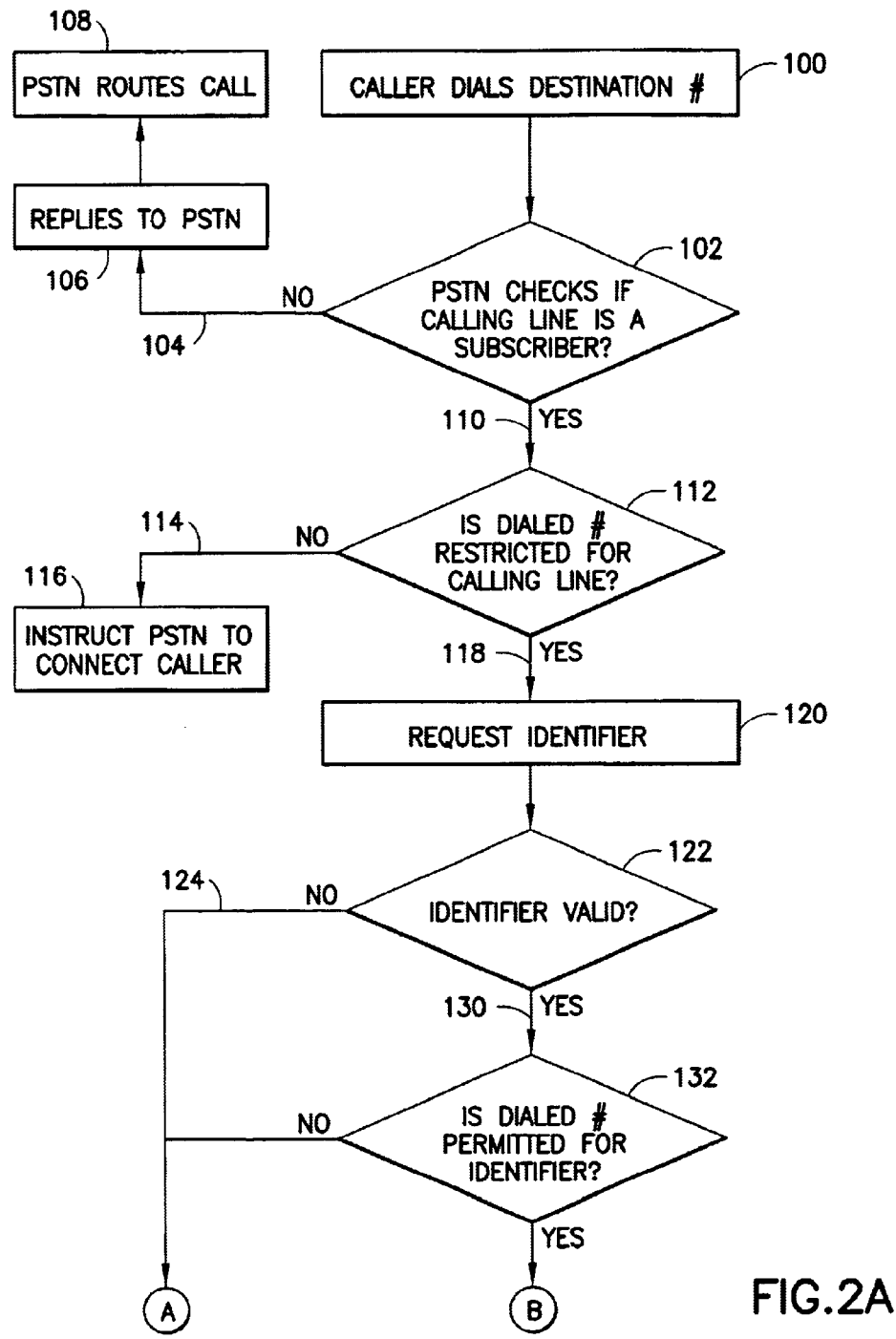
FIGS. 2A and 2B are flow diagrams of one call control recording embodiment according to the invention.
Figure 2B:
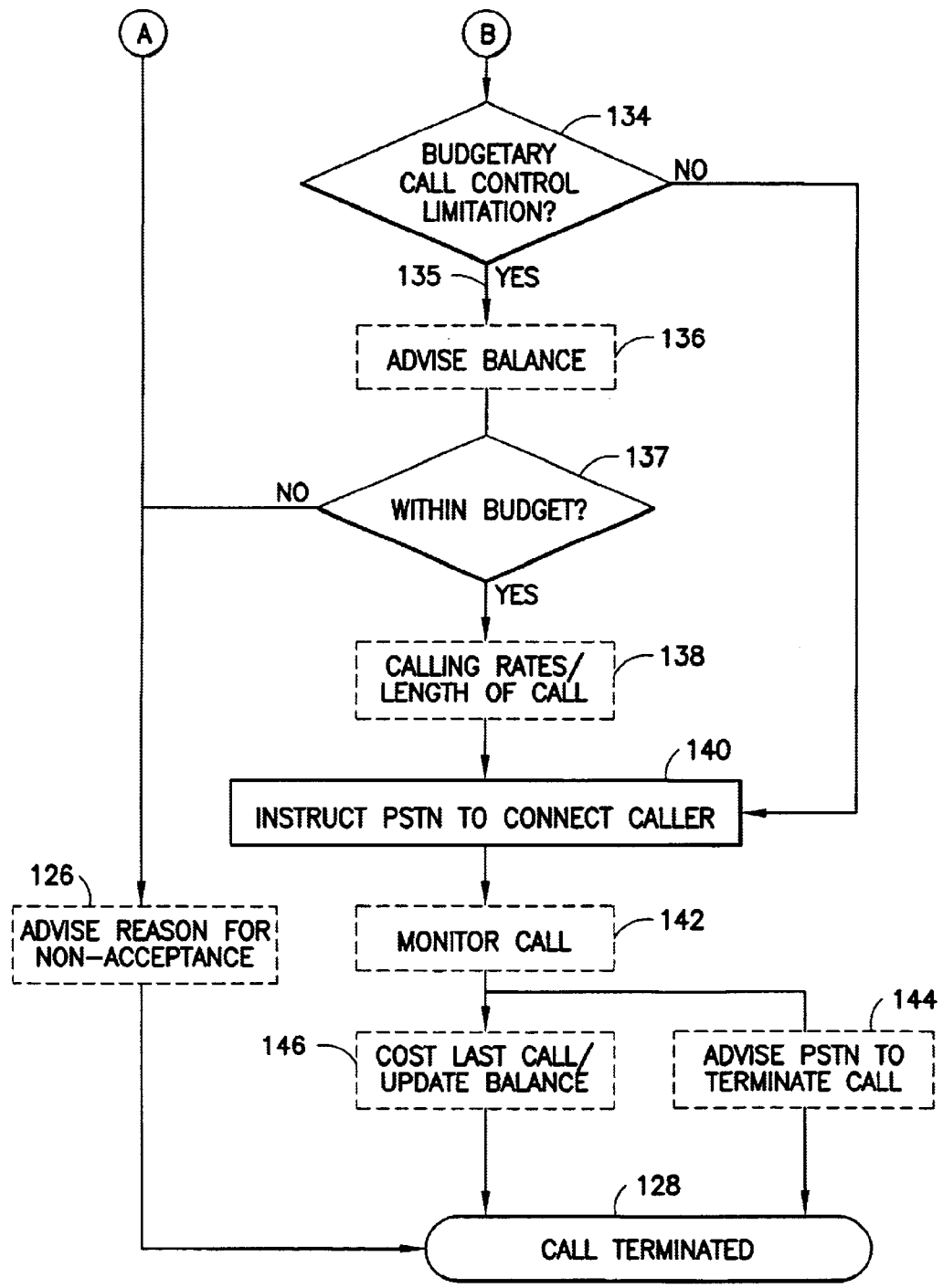

Referring to FIGS. 1, 2A and 2B, in operation, a user of a telephone 16 places a telephone off-hook to make an outgoing telephone call and dials a destination telephone number at 100. When the line goes off-hook, the PSTN 14 automatically sends a query to the server 12. At the server 12, the database 20 is queried to determine whether telephone 16 is subscribed at 102. This is done preferably using calling line identification. If the telephone 16 is not subscribed at 104, the server communicates such to the PSTN at 106, and the call is forwarded to the destination telephone number through the PSTN at 108.

Alternatively, a database of subscribed lines can be maintained at a PSTN switch to eliminate the initial query to the server 12. As such, the PSTN switch itself determines whether telephone 16 is subscribed and, if not, can forward the call to the destination telephone number.

If the telephone is subscribed to the system at 110, as indicated in the database 20, the server checks the database 20 at 112 to determine whether any of the user identifiers assigned to the users of the subscribed telephone restrict a call to the destination telephone number. If the destination telephone number is not restricted at 114, a response is provided to the PSTN at 116 permitting the PSTN to complete the telephone call. If the telephone number is restricted at 118, the server, through the IVR system of the intelligent peripheral 22, requests the user to input his/her user identifier (e.g., a numeric code or voice print) at 120, and the validity of the identifier is checked (e.g., via code lookup or voice recognition) at 122. If the user identifier is invalid at 124, the user is advised of the invalidity at 126 and the call is terminated at 128. If the user identifier is valid at 130, the server checks the database 20 to determine at 132 whether the dialed call permitted for the user's identifier (either due to the number being restricted at all times, or the particular time and/or day the call is being attempted). If the call is not permitted, the server provides the user with the reason for which the call cannot be completed at 126, and the call is terminated at 128.

If the dialed call is to a permitted telephone number for the user, the server determines at 134 whether there are any budgetary call control limitations for the user. If there are no such budgetary limitations, the server instructs the PSTN to complete the call at 140. If at 134 there are budgetary limitations which limit the amount of outgoing telephone call costs, the user is preferably advised of the remaining credit which can be applied toward call costs (as contained in the updatable account information in the database) at 136. For example, where a user identifier has a call control limitation of fifty dollars in call costs per billing period and thirty-four dollars have been already been spent during the billing period, the server may advise that a 'credit' of sixteen dollars of outgoing telephone call costs remains on account for the billing period.

The server 12 then determines at 137 whether completion of a telephone call to the dialed telephone number is within budgetary parameters for the user identifier. That is, does the account have sufficient credit available for a call of at least one minute to the dialed telephone number. If not, the server provides the user with the reason for which the call cannot be completed at 126, and the call is terminated at 128.

The server optionally provides at 138 the user with calling rates (cost/minute) for the telephone call and/or the permitted duration of the telephone call based upon the budgetary parameters for the account. As discussed below, the calling rates need not be the actual rates.

Assuming the user identifier is authorized, the server 12 instructs the PSTN (or other telephone network) at 140 to connect the subscribed telephone 16 to the telephone 18 at the destination telephone number. If the restrictions for the user's identifier includes budgetary or time limitations, the call is preferably monitored by the server at 142 to ensure that the cost/time of the call does not exceed the remaining account balance. If during the call the server determines that the cost of the call exceeds the remaining account balance or the call duration exceeds the allotted time, the PSTN (or other telephone network) may be instructed to terminate the call at 144 and the user is provided a message which indicates the reason for call termination. Optionally, at a predetermined period of time prior to exceeding the remaining account balance, a recorded message or other indication (e.g., a beep) is provided by the server to indicate to the user the call will be terminated at the end of a specified time period, e.g., one minute. As yet another option, the server may permit the current call to be completed even if the account balance is depleted, and prevent only subsequent calls until the account balance is replenished. If the telephone call is able to proceed until the user decides to end the call, at the end of the call .the server preferably provides to the user the cost of the last call and the remaining credit balance for the billing period.

Alternatively, calls do not need to be monitored. Rather, the server may provide to the switch the maximum length of time for which the call is permitted, and the switch itself operates to terminate the call if the permitted call length is exceeded and provide an indication to the server that the account balance is depleted if the call terminates voluntarily before the maximum call length is reached, the switch provides back to the server the length of time for the call, and based thereon the server can calculate a call cost and update the account balance.

After updating the user with the call cost information, the subscribed telephone is disconnected from the server at 126. Optionally, the system may permit the user to dial another telephone call after a prior call is terminated.

It is recognized that it may not always be possible for the server to have access to the calling rates for the subscribed line, particularly in real-time. Such rates are often determined by individual contract between the primary and the local and long distance carriers for that line. As such, it is difficult for the server to update account balances and provide the caller with call cost information on its own. Therefore, several additional budgeting systems may be used.

In a first alternative budget system, the server provides the primary with a variety of call rate templates. For example, fifteen templates may be provided which correspond to popular calling plans across the geographic region served by the system. The subscriber may then select one (or more) of the templates which most closely corresponds to the calling rates for the subscribed line. By way of example, one template may provide that all local calls are billed at $0.08/minute, all non-local calls within the area code of the subscribed line are billed at $0.10/minute, all domestic long-distance calls outside the area code of the subscribed line are billed at $0.20/minute, all overseas telephone calls are billed at $0.30/minute, and all calls to cellular telephone numbers are billed at $0.40/minute. If the primary cannot locate a template which generally corresponds to the rates charged to the subscribed telephone, the primary can manually enter rates into a blank template or modify an existing template, thereby instructing the system to use the completed template to calculate call rates for the calls. Moreover, it is understood that a primary may use a rate template which does not correspond to actual rates, but rather which emphasizes, or exaggerates, the rates of certain calls to better control calls. That is, if it is desired to limit calls, e.g., to mobile telephones, a template with high mobile telephone rates may be selected or manually created. As such, the templates can be used to modify calling habits.

A second alternative budget system does not require any monetary calling rates. Rather, a budget is a gross minute allotment for telephone calls. A user may be assigned a limitation of 250 minutes of telephone time, and after each call the time of the call, which is easily obtained by the server, is deducted from the account. The minute allotment may be further discriminated into a permitted number of minutes for local calls, for long distance calls, to cellular destination numbers, for Internet usage, etc.

A third alternative budget system is a hybrid between the monetary calling rates templates and the minute allotment. In this budget system, a user is limited to a certain number of calling points, e.g., 400 points. Domestic long distance calls may be assessed more points per minute than local calls. Overseas calls may be assessed more points per minute than domestic long distance. After each call, the account is updated to reflect the remaining points. The server does not need to know what are the exact per minute calling rates for the-calls. The points operate as an effective calling rate.

Moreover, the budget system does not need to be associated with a specific billing period. That is, the primary may provide a user with a budget of, e.g., $150 or 300 minutes or 750 points. The user makes telephone calls until the budget account is depleted, and then requests the primary to add more money, time, or points to the budget account, which the primary may do by logging into the server. Moreover, where a billing period is used, its length can be set by the primary. Furthermore, the primary can set the server to automatically replenish a budget account at the end of a billing period.

By logging into the account via a web-site and over the Internet, the primary may see the details of each user's account in real-time. Moreover, it is preferred that each user be able to log onto the web-site (by entering an individual user password, chosen by the user or the primary) and view the details of only his or her account. Thus, each user is able to see the log of his or her calls (preferably including the destination telephone number, the date/time of each call, the duration of the call, the effective cost of each call, and the number from which the call is made), and optionally may be permitted see his or her call control limitations, and thus can plan and follow the use of his or her calling resources, particularly the remaining account balance.

Turning now to FIG. 3, in a second embodiment of the method of the invention it is illustrated that the methodology of the invention can be performed using other steps. Because a line is subscribed, a user knows that he or she may need to dial a code for a call, but will not have to dial a code if the dialed number is not restricted (unless a logging system is implemented as described below). First, the user places a subscribed telephone off-hook and dials a coded outgoing telephone call at 200. The coded call includes dialing a numeric dialing code followed by the destination telephone number (or a destination telephone number, a delimiter, and then a calling code, e.g., 212-123-4567*42). The dialing code portion of the coded call causes the PSTN 14 to communicate with the server 12 and query the server as to the validity of the code at 202. If the dialing code is invalid at 204, a message indicating that the call has not been approved by the server is sent to the PSTN at 206. Alternatively, rather than first dialing a dialing code, the user may speak a code word or be subject to voice print recognition, in order to determine and validate the user's identity.

If the dialing code (or other user identifier) is valid at 204, it is determined at 208 whether the dialed number is permitted to be called by the user. If the user is not permitted to call the dialed number, the user is provided a message indicating such at 210 and the call is terminated at 212. If the dialed number is a permitted number at 208, the server determines at 214 whether there are any budgetary call control limitations for the user. If there are no such budgetary limitations, the server instructs the PSTN to connect the call at 216. If there exist budgetary restrictions for the user identifier, the user's account balance is checked at 218. If an insufficient credit balance remains, the user is provided a message indicating such at 210 and the call is terminated at 212. If sufficient credit balance remains at 218, the server instructs the PSTN to connect the telephone call at 216. If the user has budgetary limitations, the balance of the user's account is preferably communicated to the user before call connection at 220, and after the call is completed and prior to disconnecting from the service at 222.

In yet another alternative embodiment, the user may be required to first dial a telephone number assigned to the server, and upon answer by the server and interaction through IVR, enter the user identifier and destination telephone number to the server. This can be done at any landline telephone, pay phone, any cellular telephone, etc. Further, a subscribed line can be set up to automatically send a call to the server when particular leading digits are dialed, or even any call. Moreover, a subscribed line can have all calls which are, e.g., non-local and non-toll-free blocked, such that only local and toll-free numbers can be called. The user can then dial a local or toll-free access number to the server to make long-distance calls. By way of another-example, a cell phone that is part of a 'family' plan, in which a number is able to be dialed for free within the terms of the plan, may be setup to have the cell phone dial a server number free within the plan, enter a code, and then have calls from the cell phone controlled under the restrictions of the account. Then, upon verification of the user identifier and approval of the destination telephone number as being permitted in view of the call restrictions for the user identifier, the telephone call is connected through the PSTN (or other telephone network) to the destination telephone number.

It is recognized that certain steps in the methodology may be performed in other orders. For example, the steps of advising a user of the account credit, the determination of whether a call is within budgetary parameters, and the determination of whether a call is permitted can be performed in a different order. It is also recognized that there are numerous other embodiments which may be used to effect the call control system of the invention. For example, while the above embodiments show the step of a determination of budgetary parameters, it will be appreciated that a time or monetary budget may not be a call control limitation.

Figure 4:
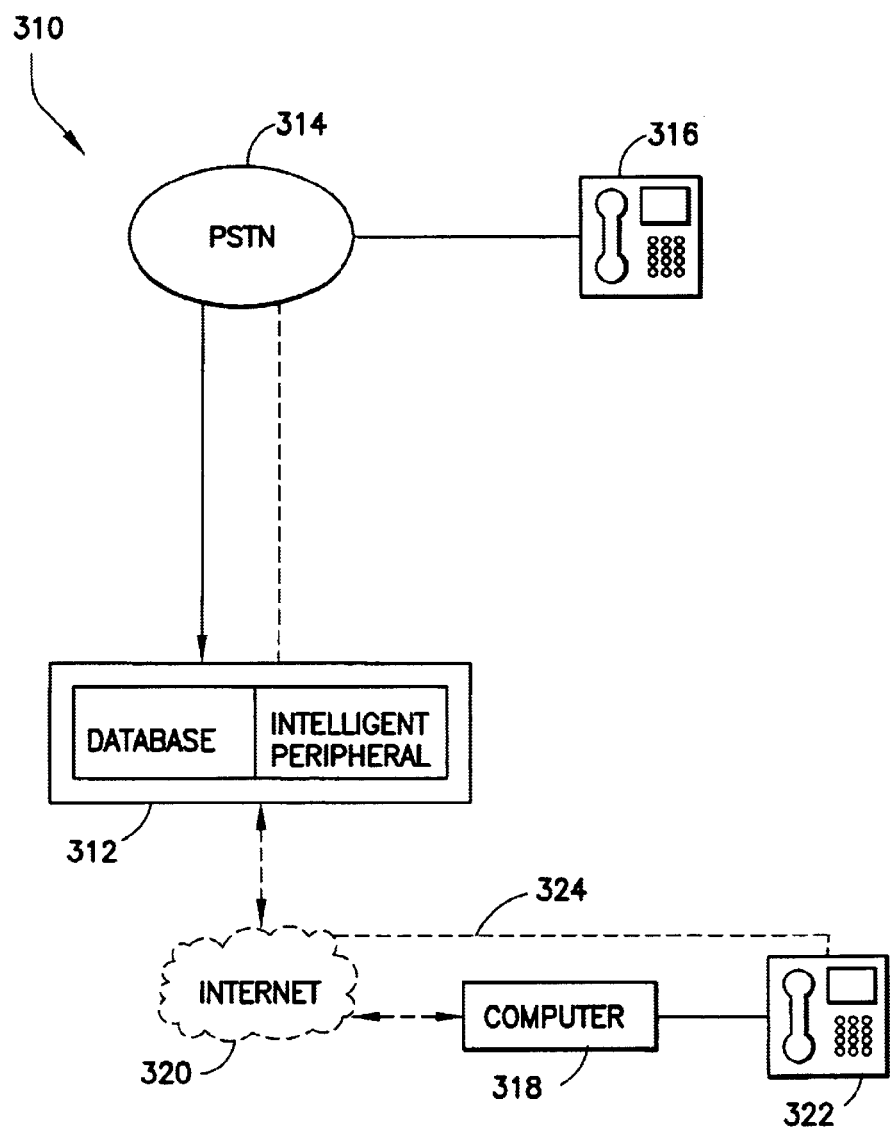
FIG. 4 is a schematic diagram of a system for outgoing telephone call control according to a second embodiment of the invention.

Turning now to FIG. 4, a second embodiment of the system is shown, which has particular application in many countries outside the North America where, even using Internet Protocol (IP) telephony, i.e., voice over IP (VOIP), a caller carries at least some responsibility for payment of calls to mobile telephones and pays extra for IP calls to overseas destination telephone numbers. The charges and payment are typically administered through the user's Internet Service Provider (ISP). The system 310 of the invention includes a server 312, a telephone network 314, and a destination telephone 316 coupled to the telephone network. In addition, a computer 318 is in communication with the server 312 through the Internet 320 using IP telephony. The methodology may be as described in any of the above methods, with the exception that the user initiates the call to the destination telephone number using an IP telephone 322. The IP telephone 322 may be either a combination of a telephony card, a microphone, and a speaker coupled to the computer 318, a discrete IP telephone coupled to the computer 318, or a discrete stand-alone IP telephone which is directly in communication with the Internet 320, as indicated by data line 324.

Figure 5:
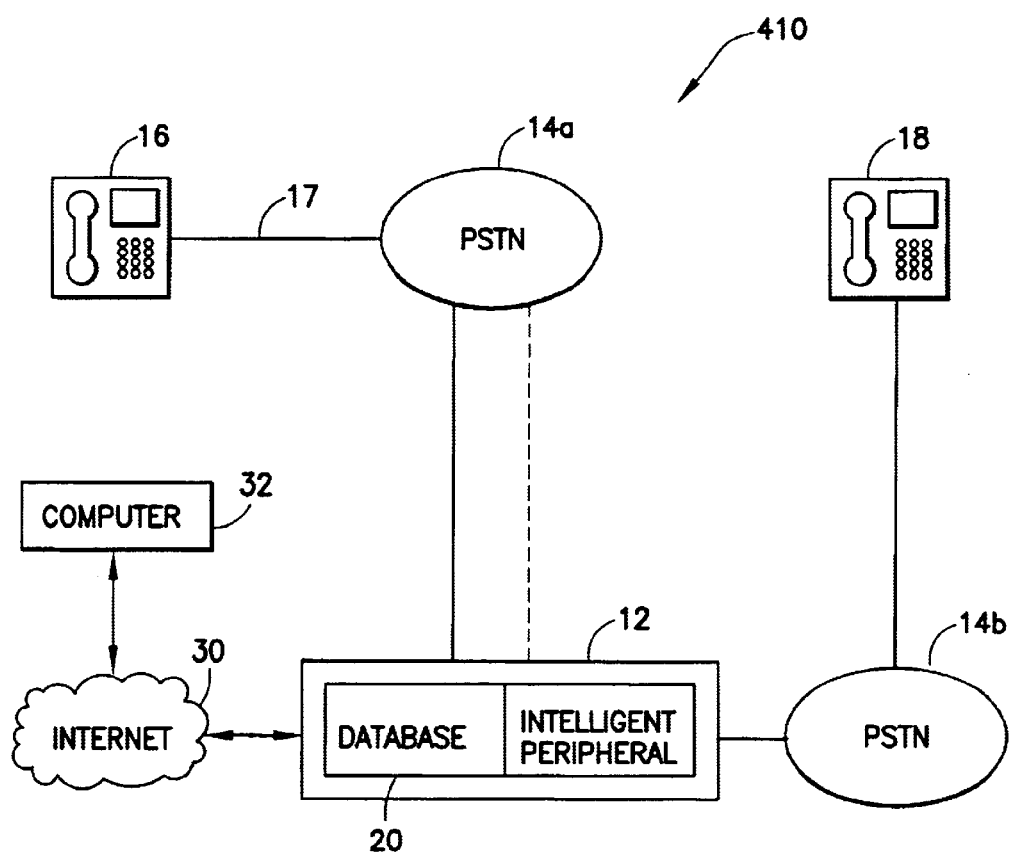
FIG. 5 is a schematic diagram of a system for outgoing telephone call control according to a third embodiment of the invention.

Referring now to FIG. 5, a third embodiment of the system, substantially similar to the first embodiment, is shown. The system 410 includes a server 12 having connections 440, 442 between two PSTNs 14a and 14b. For example, PSTN 14a may be a local carrier and PSTN 14b may be an international carrier. In this system, the server of the system can control calls across multiple PSTNs.

Figure 6:
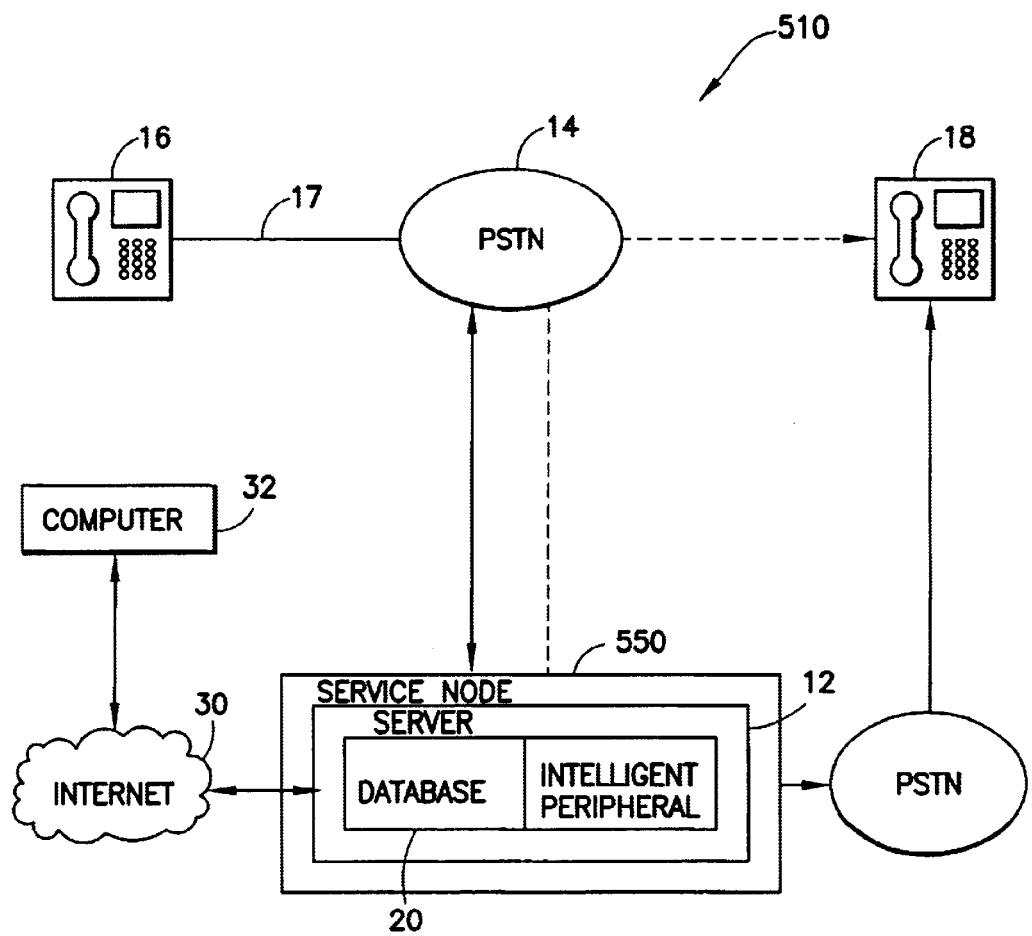
FIG. 6 is a schematic diagram of a system for outgoing telephone call control according to a fourth embodiment of the invention.

Turning now to FIG. 6, a fourth embodiment of the system, substantially similar to the first and third embodiments, is shown. The system 510 includes service node 550 which includes the server 12. When the telephone 16 goes off-hook, the PSTN automatically transfers the call to the service node 550. The service node 550 may be at a PSTN local switch, or located elsewhere.

It is recognized that the system may be used in a manner which does not assign call control limitations to any user; i.e., simply for purposes of call logging. That is, when it is desired to make a call, the user is required to enter an identifier (e.g., a user identifier, a job identifier, or a client identifier). All calls are logged to the database in the server, and a record of all calls by with respect to the identifier can be accessed preferably by users of the subscribed line and at least by the primary. As such, call logging is facilitated at the server, rather than within a telephone, a local peripheral, or a PBX. This configuration is particularly suited to business settings for purposes of client billing, employee accountability; and preventing unauthorized calls by non-employees. In addition, call logging, in both the home and business environment permits the calls listed on a telephone bill to be verified by the primary.

Furthermore, the system may be configured to identify fraudulent attempts to acquire another's user identifier. To that end, the server preferably is configured to detect attempts at fraud by determining if there are X failed attempts at entering a user identifier in Y seconds, then access to the subscribed line can be blocked by the server for Z seconds. This system at the very least hinders, and ideally prevents, unauthorized acquisition of another's user identifier. Moreover, if the server determines that service should be blocked or that attempts at fraud are suspected, notice is preferably provided to the primary.

It is also recognized that homes, businesses, dorm rooms, etc., may have more than one telephone line, and each of which may be subscribed to the system. As such, the primary can control each of the lines. In view of the possibility of multiple lines, the server may be set to block concurrent use of the same identifier over lines controlled by the primary;

Alternatively, the server may be set to limit concurrent use to a designated number of lines, e.g., two lines to a user such that a user may use one line for the Internet and another line for a voice call. By way of another example, a user may be permitted concurrent use of multiple lines, provided that each line has a different class of service, e.g., one local and one long distance.

A user's budget is then preferably for all lines under control of the primary for which the user has access. However, the use of the budget across the several lines need not be pooled equally. That is, the system supports multi-level budgeting. For example, a user may be given a maximum usage of $10 with respect to a line used for Internet communications, and a maximum usage of $20 in voice calls over another line, provided that the usage on both lines does not exceed $25 during the billing period.

Moreover, the system may be used to prevent theft of telephone service. That is, by assigning each authorized user a user identifier several types of theft can be avoided. Where service is stolen by an unauthorized hook-up to the subscribed line, telephone calls are still limited to those users having a valid user identifier. Furthermore, with respect to cellular telephone service, even if a telephone number and cellular telephone identifier are stolen and reprogrammed into another telephone, calls cannot be made if all calls over the telephone must be accompanied by a user identifier.

There have been described and illustrated herein several embodiments of a call control system and a method of controlling outgoing telephone calls. While particular embodiments of the invention have been described, it is not intended that the invention be limited thereto, as it is intended that the invention be as broad in scope as the art will allow and that the specification be read likewise. Thus, while the system is preferably maintained on a server in communication with the PSTN, the system may alternatively be maintained at a telephone network switch. Also, while the PSTN is one telephone network with which the system may be implemented, it will be appreciated that other calls may be routed/queried via a public land mobile network (such as a cellular or wireless network) as well. As such, calls from cellular telephones may be similarly controlled with the system. In addition, while a server is shown to include the database and the IVR system, it will be appreciated that the database and the IVR may be distributed over more than one component which together comprise a 'server' for purposes of the claims. Moreover, it is understood that an IVR system is not required, for example, when the system is used with a 'smartphone' which includes a display and which can convey information from the PSTN, or when used with a telephone coupled to a computer, as the computer and its display can convey information. Also, while a single database is shown, multiple databases may be used. Furthermore, multiple servers may be used, distributed at various locations throughout the telephone network. In addition, while several different user identifiers have been discussed, it will be appreciated that other user identifiers may be used. It will therefore be appreciated by those skilled in the art that yet other modifications could be made to the provided invention without deviating from its spirit and scope as claimed.

What is claimed is:

1. A method for budgeting telephone calls by a user over a telephone line, comprising:
    a) providing a plurality of templates, each having a plurality of calling rates for different types of calls, wherein at least one of said plurality of templates is defined by user-input;
    b) providing a user with an account balance;
    c) using one of the templates to determine a calling rate for a particular telephone call;
    d) monitoring a length of the particular telephone call;
    e) determining an effective cost for the particular telephone call based upon the calling rate and the length of the particular telephone call; and
    f) deducting the effective cost from the account balance to provide an updated account balance.

2. A method according to claim 1, wherein:
    said at least one template is at least one of user-created and user-modified.

3. A method according to claim 1, wherein:
    said calling rates do not all exactly correspond to the actual rates for all of the telephone calls.

4. A method according to claim 1, wherein:
    said calling rates for selected destination telephone numbers are above actual rates.

5. A method according to claim 1, wherein:
    different calling rates are provided for local destination telephone numbers, long distance destination telephone numbers, and mobile telephone numbers.

* * * * *